May 14, 1957 J. S. HEFFT 2,792,099
LOG FEEDING APPARATUS
Filed Oct. 18, 1954 2 Sheets-Sheet 1
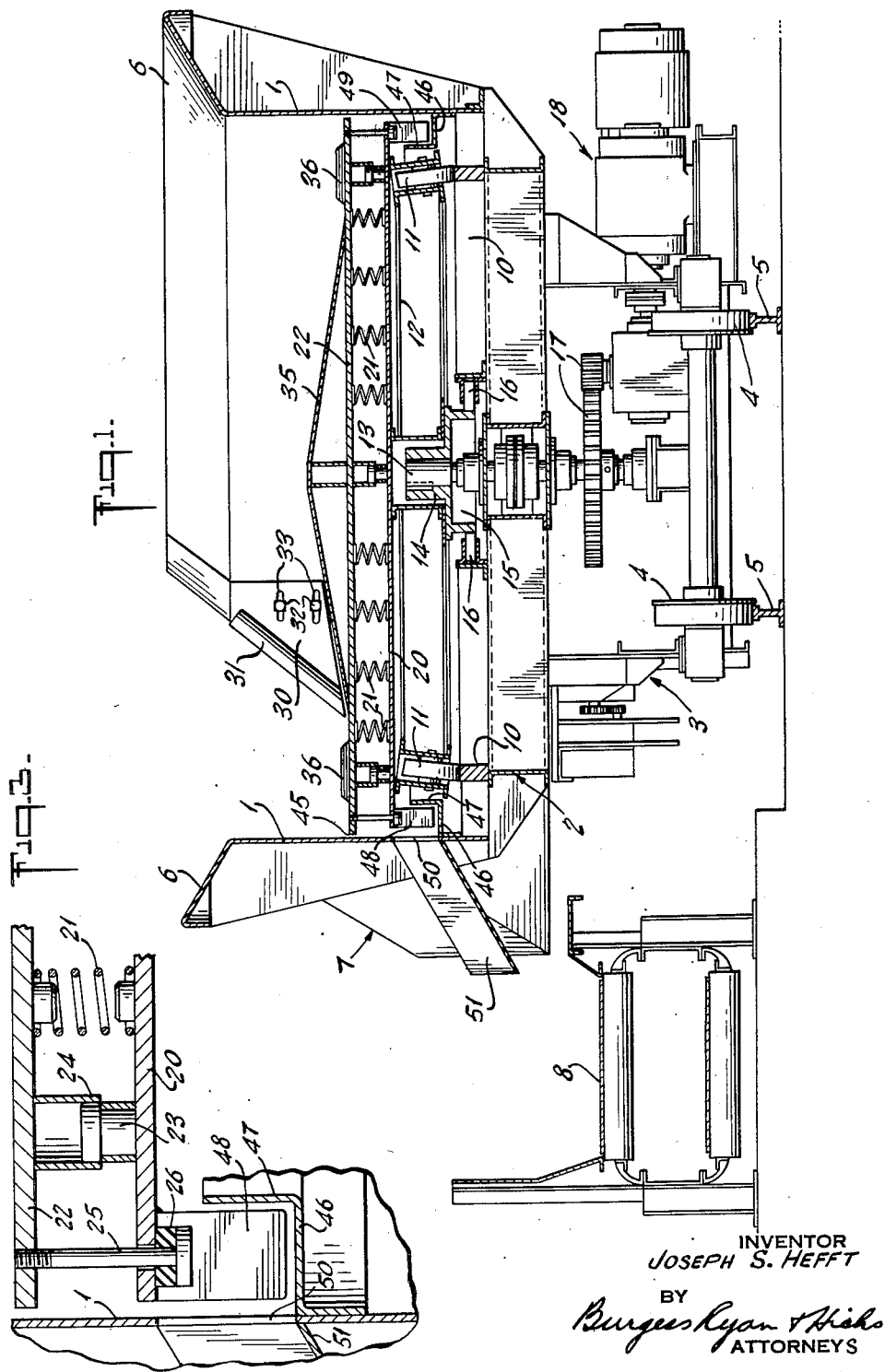
INVENTOR
JOSEPH S. HEFFT
BY
Burgess Ryan & Hicks
ATTORNEYS

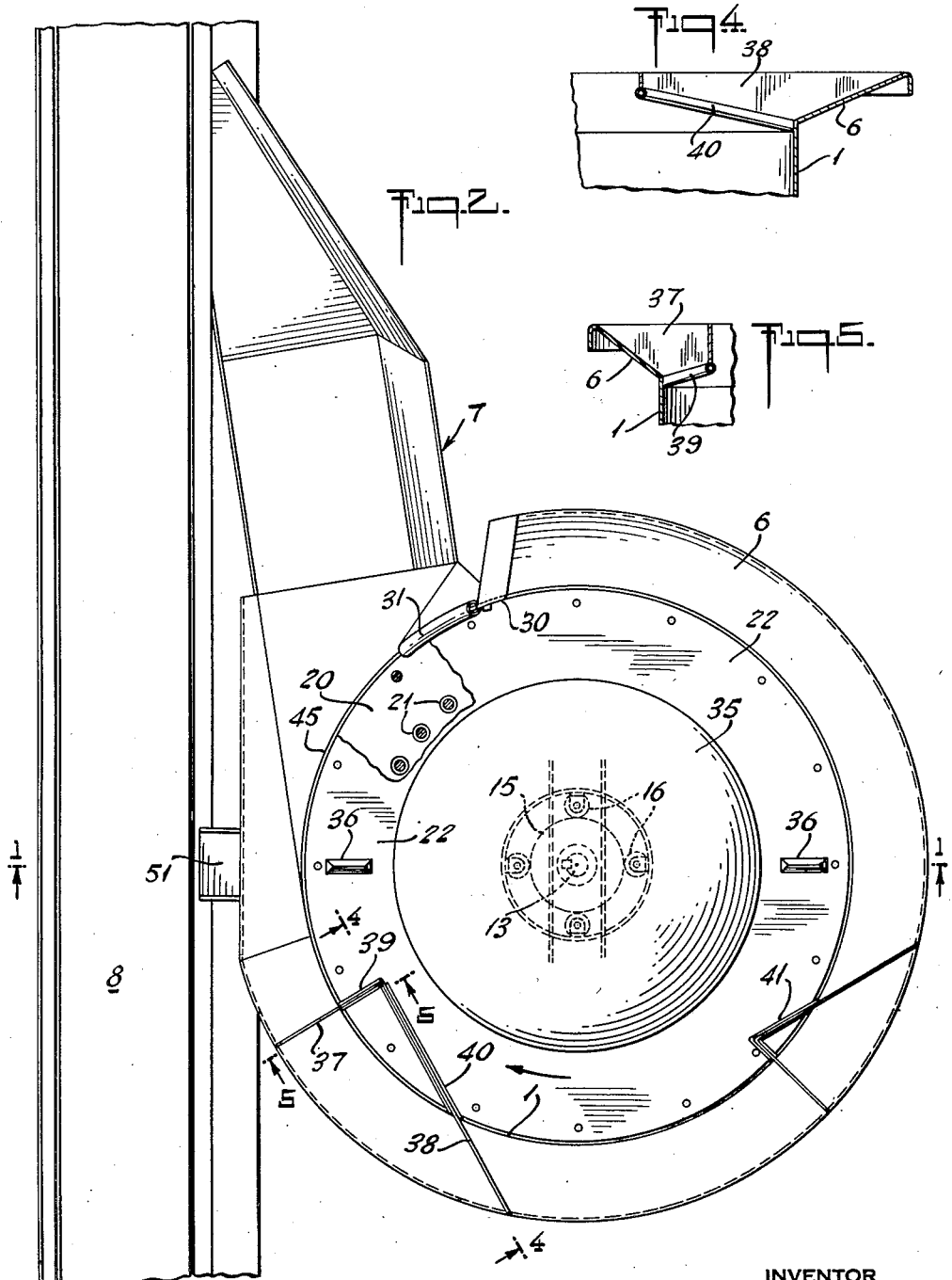

United States Patent Office 2,792,099
Patented May 14, 1957

2,792,099
LOG FEEDING APPARATUS

Joseph S. Hefft, Montclair, N. J., assignor to Hewitt-Robins Incorporated, Stamford, Conn., a corporation of New York Application October 18, 1954, Serial No. 462,643

6 Claims. (Cl. 198—30)

This invention has to do with the problem of moving logs from a source, such as a stack or jack straw pile, to a more or less remote destination by means of some form of conveyor. Particularly in the case of large logs, for example, in 5' 3" lengths and weighing up to, say, seven or eight hundred pounds, manual handling, of course, is out of the question and the problem, specifically, is to provide some means of getting the logs on to a suitable conveyor with reasonable speed and yet without wrecking it.

The present invention has for its object the provision of apparatus into which the logs can be dumped in random fashion and by which the logs are fed out in succession and so oriented and discharged as to be receivable by a conveyor without undue damage to it. The preferred form of apparatus is so constructed that even a belt conveyor can be utilized, in lieu of chain types such as heretofore deemed necessary to withstand the rough treatment incident to the loading of logs by other methods.

In general, the apparatus includes an open-topped circular bin having a rotatable floor, together with various features described at length below and illustrated in the accompanying drawings.

In these drawings:

Fig. 1 is a vertical section of a preferred form of apparatus, the section being taken on the line 1—1 of Fig. 2;

Fig. 2 is a plan view of the apparatus;

Fig. 3 is an enlarged, broken out, sectional view of a detail;

Fig. 4 is a broken out sectional view on the line 4—4 of Fig. 2; and

Fig. 5 is a broken out sectional view on the line 5—5 of Fig. 2.

The illustrated apparatus includes a circular, open-topped bin of which the side or surrounding wall is stationary and the floor rotatable. The bin wall, generally designated 1, is rigidly supported on a platform structure 2 seated on an undercarriage 3 which, for convenience, is provided with wheels 4 to run on tracks 5. The top portion of the wall is flared, as at 6, and the wall is interrupted to provide a discharge opening into a tangentially arranged chute 7. An endless conveyor 8 is disposed beneath its outlet end and extends longitudinally of the chute.

The platform structure 2 supports a circular track 10 to receive the rollers 11 of a turntable structure 12 which supports the bin floor. The turntable structure is driven by a vertical shaft 13 keyed to a hub 14 which is secured to the turntable structure and which incorporates a depending, centering flange 15 engaged by rollers 16. Shaft 13 is driven through gearing 17 and a reduction box by motor 18.

The upper part of the turntable structure includes a backing plate 20 and, resiliently supported on it by a plurality of springs 21, a floor plate 22. The springs serve to absorb some of the impact of the logs dumped into the bin, the floor plate being held against lateral displacement by headed studs 23 (Fig. 3) upstanding from the backing plate and received in cups 24 depending from the underside of the floor plate The latter is restrained against excessive rebound, as by lug bolts 25 (Fig. 3) depending from the floor plate. A rubber cushion block is indicated at 26, between the bolt head and the underside of the backing plate.

In operation, the logs are picked up from the stack or pile, as by the grab of a crane, and dumped into the hopper, the floor being rotated in the direction of the arrow (Fig. 2) at a speed appropriate to cause the logs to move to the periphery of the floor and be discharged endwise by centrifugal action into and down the chute, whence they feed directly on to the conveyor. For logs of the size indicated above and a pin diameter of the order of 12 feet, the floor may be rotated at a speed of about 15 R. P. M.

In order to minimize the chance of logs jamming at the outlet from the bin, it has been found desirable to provide the bin wall on the far side of the discharge opening (that is, the remote side with reference to the direction of rotation of the bin floor) with a deflector or plough head directed toward the opening and suitably rounded and tapered. It is indicated as consisting of a triangular-shaped plate 30, curved to fit the bin wall and having its upper edge rounded, as by a pipe bead 31. The head thus serves to deflect any log which strikes it, either into the chute or back into the bin, there being no sharp edge or vertically disposed flat surface against which the end of a log can seat. In this preferred form also, the head is adjustably secured to the bin wall, as by bolts 32 passing through bin wall slots 33, so as to permit the width of the discharge opening to be varied.

Another advantageous feature of this preferred form is the formation of the bin bottom 35 and in the shape of a flat or shallow cone. The purpose is to prevent a log or logs from taking up a more or less central position on the bin floor and simply rotating with it. By sloping the bin floor and causing the logs to tend to move outwardly, a slower speed of rotation is permitted.

Occasionally, a temporary jam may tend to occur as the result of some peculiar disposition or formation of the logs on the bin floor but it has been found that it can be broken up automatically if the floor is provided with one or more log-moving elements, such as the upstanding cam-shaped lug members 36. They can be relatively small (considerably less than the diameters of the logs) since their purpose is simply to jog loose any log which tends to remain stationary or move at a slower speed than the bin floor.

It has also been found that, on occasion, a log may be so dumped into the bin or acted upon by other logs in it that it tends to assume a more or less erect position adjacent the wall. In order to guard against any such log being thrown overboard from the bin or reaching the wall opening in an attitude inappropriate for discharge down the chute and on to the conveyor, means are preferably provided for causing any such log to be tipped over. As illustrated in Figs. 2, 4 and 5, such means comprises a pair of plates 37, 38 welded to the flared portion of the bin wall and projecting in over the bin floor, the lower projecting edges of the plates being reinforced and rounded by pipe beads 39, 40. Thus, any up-ended log moving around the periphery of the bin engages the projection and is carried inwardly by it and toppled back over on to the bin floor. A second and similar projection is indicated at 41 (Fig. 2).

The action of the logs upon each other in the bin is found to remove a great deal of bark which accumulates in such quantities as to constitute a problem unless appropriate provision is made for handling it.

As illustrated, a space or clearance 45 is provided around the periphery of the bin floor, that is, between it and the bin wall, through which the bark escapes and means are provided for collecting such bark. In this form, the collecting means comprises a duct or trough positioned to receive the bark falling through the space 45, the duct floor and inner wall being indicated at 46, 47 (Fig. 1) and its outer wall being formed by the lower part of the wall of the bin itself.

In order to dispose of the bark accumulating in the duct, scraper means are provided for removing the bark by the rotation of the bin floor and its supporting turntable structure. In the embodiment illustrated, two blades 48, 49 are shown secured to and depending into the duct from the underside of the backing plate 20 and, at 50, there is an opening in the bin wall through which the bark is discharged, or at least enough of it to avoid any undue accumulation in the duct. A chute 51 is located to receive the discharged bark and direct it on to the conveyor or elsewhere, as may be desired.

In the light of the foregoing description exemplifying the principles of the invention, the following is claimed:

1. Log feeding apparatus comprising a circular, open-topped bin consisting of a stationary wall and a rotatable floor, said wall having a discharge opening and a tangential discharge chute aligned therewith, means for rotating the bin floor at a speed to cause logs dumped into the bin to move to the periphery of the floor and be discharged endwise into the chute by centrifugal action, said floor being spaced around its periphery from the said wall to permit the escape of bark removed from the logs by their interaction in the bin, and means for collecting the said bark.

2. Log feeding apparatus comprising a circular, open-topped bin consisting of a stationary wall and a rotatable floor, said wall having a discharge opening and a tangential discharge chute aligned therewith, means for rotating the bin floor at a speed to cause logs dumped into the bin to move to the periphery of the floor and be discharged endwise into the chute by centrifugal action, the wall of the bin on the far side of the discharge opening incorporating a deflector head directed and tapering downwardly toward the near side of said opening.

3. Log feeding apparatus comprising a circular, open-topped bin consisting of a stationary wall and a rotatable floor, said wall having a discharge opening and a tangential discharge chute aligned therewith, means for rotating the bin floor at a speed to cause logs dumped into the bin to move to the periphery of the floor and be discharged endwise into the chute by centrifugal action, said floor being spaced around its periphery from the said wall to permit the escape of bark removed from the logs by their interaction in the bin, a duct positioned for receiving the said bark and means for expelling the bark from the said duct.

4. Log feeding apparatus comprising a circular, open-topped bin consisting of a stationary wall, a turntable structure and a bin floor supported thereon, said wall having a discharge opening and a tangential discharge chute aligned therewith, means for rotating the turntable structure at a speed to cause logs dumped into the bin to move to the periphery of the floor and be discharged endwise into the chute by centrifugal action, said floor being spaced from the bin wall to permit the escape of bark, a stationary duct positioned to receive the bark and a blade extending into the duct for discharging the bark therefrom, said blade being secured to the turntable structure for rotation therewith.

5. Log feeding apparatus comprising a circular, open-topped bin consisting of a stationary wall, a turntable structure and a bin floor supported thereon, said wall having a discharge opening and a tangential discharge chute aligned therewith, means for rotating the turntable structure at a speed to cause logs dumped into the bin to move to the periphery of the floor and be discharged endwise into the chute by centrifugal action, said floor being spaced from the bin wall to permit the escape of bark, duct means positioned to receive the bark and discharge means for expelling the bark from the duct means, one of such means being stationary and the other associated with the turntable structure for rotation therewith.

6. Log feeding apparatus comprising a circular, open-topped bin consisting of a stationary wall and a rotatable floor, said wall having a discharge opening and a tangential discharge chute aligned therewith, means for rotating the bin floor at a speed to cause logs dumped into the bin to move to the periphery of the floor and be discharged endwise into the chute by centrifugal action, said floor having at least its center portion raised above its periphery and of a flat cone shape and the wall of the bin on the far side of the discharge opening incorporating a deflector head directed and tapering downwardly toward the near side of said opening.

References Cited in the file of this patent

UNITED STATES PATENTS

| | | |
|---|---|---|
| 1,495,610 | Paridon | May 27, 1924 |
| 1,719,305 | Pardee | July 2, 1929 |
| 2,594,337 | Noe | Apr. 29, 1952 |
| 2,629,481 | Stover | Feb. 24, 1953 |
| 2,642,173 | Wehmiller et al. | June 16, 1953 |